US011152175B2

(12) United States Patent
Koprivsek et al.

(10) Patent No.: US 11,152,175 B2
(45) Date of Patent: Oct. 19, 2021

(54) ALTERNATIVELY CHANGEABLE ELECTRIC CIRCUIT AND METHOD FOR CHANGING OF ELECTRIC CURRENT PATH WITHIN AN ELECTRIC CIRCUIT

(71) Applicant: NELA RAZVOJNI CENTER ZA ELEKTROINDUSTRIJO IN ELEKTRONIKO, D.O.O., Zelezniki (SI)

(72) Inventors: Mitja Koprivsek, Izlake (SI); Brane Lebar, Zagorje ob Savi (SI)

(73) Assignee: Nela Razvojni Center Za Elektroindustrijo in Elektroniko, D.O.O.

( * ) Notice: Subject to any disclaimer, the term of this patent is extended or adjusted under 35 U.S.C. 154(b) by 0 days.

(21) Appl. No.: 16/980,813

(22) PCT Filed: Dec. 5, 2018

(86) PCT No.: PCT/SI2018/000025
§ 371 (c)(1),
(2) Date: Sep. 14, 2020

(87) PCT Pub. No.: WO2019/177546
PCT Pub. Date: Sep. 19, 2019

(65) Prior Publication Data
US 2021/0159035 A1     May 27, 2021

(30) Foreign Application Priority Data
Mar. 14, 2018   (SI) .................. P-201800060

(51) Int. Cl.
*H01H 39/00*     (2006.01)
(52) U.S. Cl.
CPC .......... *H01H 39/00* (2013.01); *H01H 39/006* (2013.01); *H01H 2039/008* (2013.01)

(58) Field of Classification Search
CPC . H01H 39/00; H01H 39/006; H01H 2039/008
See application file for complete search history.

(56) References Cited

U.S. PATENT DOCUMENTS 5,793,275 A * 8/1998 Iversen ................ H01H 85/055
337/273
6,556,119 B1 * 4/2003 Lell ...................... H01H 39/006
337/157

(Continued)

FOREIGN PATENT DOCUMENTS

| EP | 2811549 A1 | 12/2014 |
| GB | 2352879 A | 2/2001 |
| SI | 25501 A | 2/2019 |

OTHER PUBLICATIONS

International Search Report and Written Opinion dated Apr. 3, 2019 issued in corresponding PCT App. No. PCT/SI2018/000025 (10 pages).

(Continued)

*Primary Examiner* — Jacob R Crum
(74) *Attorney, Agent, or Firm* — Haynes and Boone, LLP; William B. Nash; Jason Whitney

(57) ABSTRACT

An alternatively changeable electric circuit comprising a voltage source, an electric load electrically connected with said electric voltage source via a basic electric conductor having a primary branch and a secondary branch, and an alternative conductor connected in parallel to said basic electric conductor, wherein upon fulfillment of a predetermined circumstance, said primary branch is physically interrupted, causing an electric current which initially flowed through said primary branch to be redirected through said alternative conductor. The alternative conductor comprises two electric conductive sections which are aligned with each other and spaced apart at a distance, forming an electrically insulating gap there-between. The primary branch includes (Continued)

an electrically conductive section, which upon the predetermined circumstance is removable from the primary branch and displaceable into said gap between said two electric conductive sections, causing the alternative conductor to become bridged and electrically conductive.

9 Claims, 1 Drawing Sheet

(56) References Cited

U.S. PATENT DOCUMENTS

| | | | |
|---|---|---|---|
| 9,058,940 B2* | 6/2015 | Borg | H01H 15/06 |
| 2006/0049027 A1* | 3/2006 | Iversen | H01H 39/006 |
| | | | 200/61.8 |
| 2010/0328014 A1* | 12/2010 | Suzuki | H01H 39/00 |
| | | | 337/30 |
| 2013/0126326 A1 | 5/2013 | Borg | |
| 2014/0061011 A1* | 3/2014 | Nakamura | H01H 39/00 |
| | | | 200/61.08 |
| 2016/0351364 A1* | 12/2016 | Fukuyama | H01H 39/006 |

OTHER PUBLICATIONS

Written Opinion of the International Preliminary Examining Authority dated Jan. 7, 2020 issued in corresponding PCT App. No. PCT/SI2018/000025 (6 pages).

International Preliminary Report of Patentability dated Mar. 31, 2020 issued in corresponding PCT App. No. PCT/SI2018/000025 (24 pages).

* cited by examiner

ALTERNATIVELY CHANGEABLE ELECTRIC CIRCUIT AND METHOD FOR CHANGING OF ELECTRIC CURRENT PATH WITHIN AN ELECTRIC CIRCUIT

CROSS-REFERENCE TO RELATED APPLICATIONS

This application is a United States national phase application of co-pending international patent application number PCT/SI2018/000025 filed on 5 Dec. 2018, which claims the benefit of Slovenia Patent Application No. P-201800060 filed on 14 Mar. 2018, which is hereby incorporated by reference in its entirety.

BACKGROUND

The present disclosure refers to an alternatively changeable electric circuit, which comprises at least a source of a direct or alternative voltage, at least one electric load, which is via a primary branch and a secondary branch of a basic electric conductor electrically connected with said electric voltage source, wherein an alternative conductor is connected in parallel to said basic electric conductor, so that in each predetermined circumstances i.e. by fulfilling each predetermined conditions said primary branch is interrupted, upon which the electric current, which has initially flowed through said primary branch, is redirected through said alternative electric conductor. Moreover, the disclosure also refers to a method for changing of electric current path within an electric circuit.

The disclosure relies on a problem, how to conceive an electric circuit with previously mentioned features, in which the electric current could be redirected from the one primary branch of the basic electric conductor in said circuit into an alternative electric conductor, which is connected with said basic conductor, by which said branch of the primary branch of the basic electric conductor would be simultaneously and irreversibly interrupted, and in which also potential negative effects could be avoided, which usually occur by interruption or redirecting of the electric current, namely possible re-establishment of the interrupted circuit, deflection or vibrating of the interrupting element, generation of the electric arc or overheating of conductors or contact surfaces, or short-circuit.

A switch assembly for interrupting a direct voltage electric circuit is disclosed in the Slovenian patent application No P-201700309, and is upon establishing of electrical interconnection via a primary electric conductor and a secondary electric conductor mountable between each direct voltage source and at least one electric load. A primary pole of the voltage source is via said conductors of the switch assembly correspondingly connectable with a primary pole of each electric load, and the secondary pole of the voltage source is electrically connectable with a secondary pole of each electric load.

Said primary electric conductor in such switch is formed of two branches, which are in parallel connected with each other, wherein the first branch includes an electric fuse with a melting member, and the second branch includes a pyrotechnic switch, which comprises an interrupting member, which is capable to interrupt the second branch of the primary electric conductor, as well as an actuator, which is intended for displacing said interrupting member due to interruption of said second branch of the primary electric conductor by means of explosion of at least one chemical reactant contained therein on the basis of an electric impulse.

Said pyrotechnic switch comprises such interrupting member, which is in said pyrotechnic switch movable from its first i.e. conductive position, in which said second branch of the primary electric conductor is conductive and in which said interrupting member is maintained at a sufficient distance apart from the secondary electric conductor, into its second i.e. interrupted position, in which the electric current through the second branch of the primary electric conductor in the switch assembly is interrupted, while said interrupting member is positioned in an electrically conductive contact with the secondary conductor of the switch assembly.

In such solution said actuator is via said interrupting member electrically connectable with the secondary conductor of the switch assembly and comprises an electric initiation component, which is suitable for initiation of an explosive chemical reaction of at least one chemical reactant contained therein on the basis of an electric impulse;

an actuating member, which is during said chemical reaction of the reactant upon activation of said initiation component displaceable in a direction towards the interrupting member due to performing of displacement of the interrupting member from its first position in contact with the primary conductor and apart from the secondary conductor into its second position in contact with secondary conductor; as well as an electric circuit, which is in addition to both branches, which are in serial connected with each other, integrated within said primary electric conductor in such manner, that it is connected with each electric voltage source and each electric load in serial with said branches of the primary conductor, wherein said electric circuit consists of at least one irreversible electric fuse with a contact member, which is during regular operation of the switch assembly interrupted and is closed i.e. conductive only when an electric overload occurs, as well as of at least one electromagnetic reed switch with an interrupting member, which is during regular operation of the switch assembly interrupted and is closed i.e. conductive as soon as the electric current within the switch assembly exceeds a predetermined value, wherein said fuse of the actuator and said electromagnetic switch of the actuator are in parallel connected with each other, and wherein even in the case, when the actuator is furnished with more than one fuse, each disposable fuses are connected in parallel with each other, and quite analogously, also each disposable electromagnetic switches are connected in parallel with each other, whenever the actuator is furnished with more than one such switch.

As mentioned, said interrupting member is intended for redirecting of the electric current path. Namely, by displacing said interrupting member from its first to its second position the current through one electric conductor is interrupted, but due to changed path of the electric current simultaneously another circuit through the alternative electric conductor is established. However, by quickly displacing said interrupting member due to relatively high forces acting thereon various negative effects may occur, like e.g. deflection or vibration of the interrupting member, which may generally result in undesired re-establishment of the electric circuit through said conductor, which would have to remain interrupted, or even generation of the electric arc, or overheating of conductors or contact surfaces.

Moreover, an appliance for detecting of electric current overloads is disclosed in EP 2 811 549 A1 and enables interruption of an electric conductor in the case of overloading, but not also redirection of the current into another conductor. Such appliance comprises two electric conductors, via which each load is connected with an electric voltage source. Said conductors extend through a gas impermeable chamber, in which closely to each conductor, in addition to a pyrotechnic actuator, also a cylindrical area is available, in which a piston is available, which is displaceable in a direction towards each corresponding conductor. Actuator is triggered in predetermined circumstances and when predetermined conditions are fulfilled. By triggering said pyrotechnic actuator, the pressure inside said chamber rapidly increases, which results in displacing said pistons towards the conductors, which is followed by cutting i.e. interruption of each conductor by means of a piston by simultaneously establishing short circuit, which is detected by other components within the electric circuit, which upon that interrupt the circuit. In such case, said interruption of the electric circuit is performed relatively quickly, but the sequence of measures up to interruption is quite inappropriate.

Further electric circuit braking switches are disclosed in GB 2 352 879 A and US 2013/126326 A1.

The present disclosure refers to an alternatively changeable electric circuit, which comprises at least a source of a direct or alternative voltage, at least one electric load, which is via a primary branch and a secondary branch of a basic electric conductor electrically connected with said electric voltage source, wherein an alternative conductor is connected in parallel to said basic electric conductor, so that in each predetermined circumstances i.e. by fulfilling each predetermined conditions said primary branch is physically interrupted, upon which the electric current, which initially flowed through said primary branch, is then redirected through said alternative electric conductor. Said alternative electric conductor, which is in parallel connected with each corresponding branch of said basic conductor, consists of two electric conductive sections, which are aligned with each other and spaced apart from each other at a predetermined distance, so that an electrically insulating gap is formed there-between, and that said branch of the basic conductor includes an electrically conductive section, which is in each predetermined circumstances i.e. by fulfilling each predetermined conditions physically removable from the rest of said branch and displaceable into said gap between said sections of the alternative conductor, which herewith becomes bridged and electrically conductive. Said electrically conductive section represents a part of material of said branch of the basic electric conductor, which is furnished with at least one mechanically weakened area and is in said weakened area by means of appropriate mechanical loading separable apart from the residual material of said branch. Said weakened area is substantially an area, in which the transversal cross-section is essentially smaller than in the residual areas of the branch of the basic electric conductor. Said electric circuit, in addition to said conductors, also comprises a pyrotechnic actuator, which is suitable for being triggered in each predetermined circumstances and by fulfilling each predetermined conditions, and is arranged adjacent to said section of said weakened branch of the basic conductor, and said section is then by means of said pyrotechnic actuator mechanically separable apart from the rest of said branch and displaceable into the gap between said sections of the alternative conductor.

The disclosure proposes that said removable section of the branch of the basic electric conductor, which is furnished with said weakened portion, is on that its side, which is faced towards said pyrotechnic actuator, furnished with a cavity, and is moreover on its opposite side, which is faced towards said gap between said sections of the alternative conductor, furnished with a convex external surface, which is suitable for being impressed and jammed between said sections of the alternative electric conductor within the gap. Moreover, said removable section is separable apart from the rest of said branch of the basic electric conductor in the area of said weakened areas and is displaceable into said gap in order to remain jammed between the sections of the alternative electric conductor by means of a pressure, which is established by means of explosion of chemical reactants within said pyrotechnic actuator, which is initiated in each predetermined circumstances and by fulfilling each predetermined conditions. To this aim, said pyrotechnic actuator is connected with at least one sensor, which in each predetermined circumstances and by fulfilling each predetermined conditions generates a signal, which is required for activation of said actuator, wherein at least one sensor is suitable for detecting acceleration and/or temperature and/or electric current value.

Still further, said alternative electric conductor can be electrically connected with at least one further branch of the basic electric conductor as well as with at least one further electric component, or even with at least one further branch of the basic electric conductor and at least one further electric circuit.

The present disclosure also refers to a method of changing each path of the electric current within an electric circuit comprising at least a direct or alternative voltage source as well as at least one electric load, which is via a primary branch and a secondary branch of a basic electric conductor electrically connected with said electric voltage source, and wherein an alternative electric conductor is connected in parallel to one branch of said basic conductor and is interrupted by a gap, so that in each predetermined circumstances and by fulfilling each predetermined conditions said branch can be physically interrupted, upon which the electric current therein is redirected through said alternative electric conductor. In such method, the disclosure provides that said redirecting of the electric current within said circuit, which is generated by said source, is performed by physical removal of a section of the branch of the basic electric conductor apart from the rest thereof, as well as by displacing said section into said gap between said sections of the alternative conductor, which is connected with said branch, so that said gap between said sections is bridged and the current is redirected through said alternative conductor, wherein said displaced section remains jammed between the sections of the alternative electric conductor, while said branch remains permanently interrupted and each conduction of the electric current there-through is disabled.

Although said displacement of said section into said gap between both sections of the alternative conductor can be generally performed either by using mechanical means or by means of explosion of chemical reactants within said pyrotechnic actuator, the disclosure also provides using of a suitable magnetic field to this aim.

BRIEF DESCRIPTION OF THE DRAWINGS

The present disclosure will now be explained in more detail on the basis of an embodiment, which is presented in the attached drawings.

DETAILED DESCRIPTION

Figure 1:
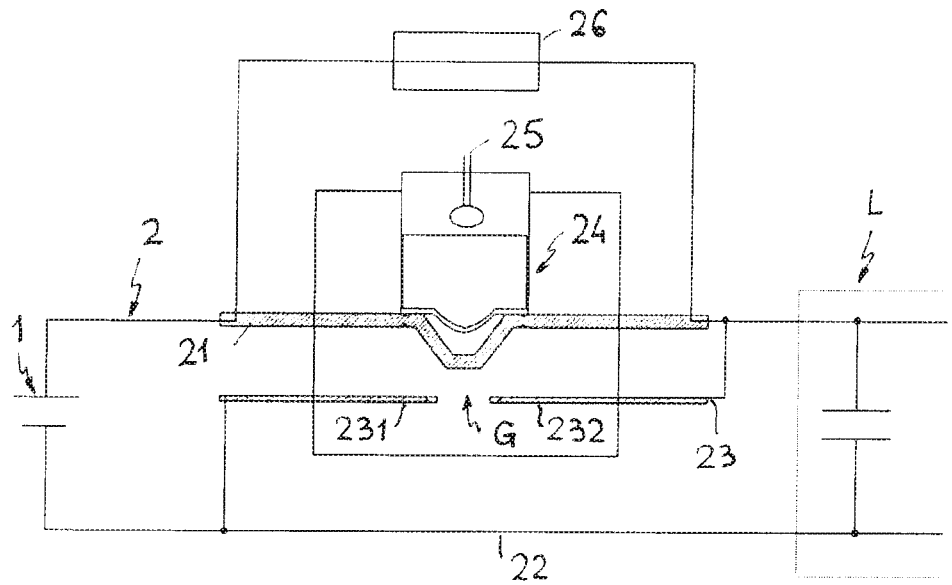
FIG. 1 is a schematically presented electric circuit according to the embodiment, in its initial state.

An alternatively changeable electric circuit comprises at least a voltage source 1, which is in this embodiment a direct voltage source, as well as at least one electric load L, which is via a primary branch 21 and a secondary branch 22 of a basic electric conductor 2 electrically connected with said electric voltage source 1. Said voltage source 1 may optionally be an alternative voltage source.

An alternative conductor 23 is connected in parallel to said basic electric conductor 2, so that in each predetermined circumstances i.e. by fulfilling each predetermined conditions said primary branch 21 is physically interrupted, upon which the electric current, which initially flowed through said primary branch 21, is then redirected through said alternative electric conductor 23.

Figure 2:
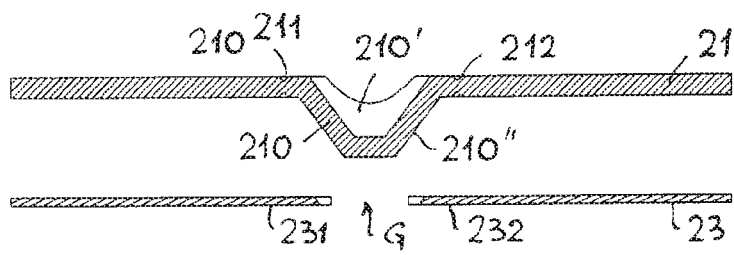
FIG. 2 is a detailed presentation of uninterrupted branch of a basic conductor in the circuit according to FIG. 1 and interrupted alternative conductor.
Figure 3:
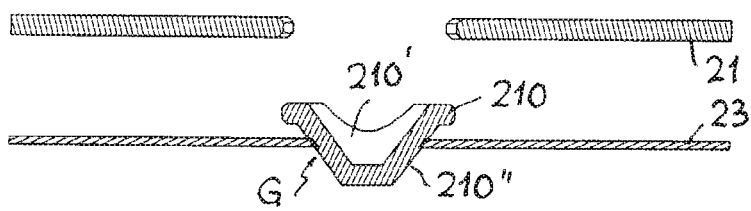
FIG. 3 detailed presentation as in FIG. 2, however upon redirection of the electric current in the circuit.

Said alternative electric conductor 23, which is in parallel connected with each corresponding branch 21 of said basic conductor 2, consists of two electric conductive sections 231, 232, which are aligned with each other and spaced apart from each other at a predetermined distance which forms a gap G, and are moreover each per se connected with the corresponding branch 21 of the basis electric conductor 2. Consequently, in the state according to FIGS. 1 and 2 a gap G is available between said sections 231, 232, which is not electric conductive.

Said branch 21 of the basic conductor 2 includes an electrically conductive section 210, which is in each predetermined circumstances i.e. by fulfilling each predetermined conditions physically removable from the rest of said branch 21 and displaceable into said gap G between said sections 231, 232 of the alternative conductor 23, which herewith becomes bridged and electrically conductive.

In a preferred embodiment of the disclosure said electrically conductive section 210 represents a part of material of said branch 21 of the basic electric conductor 2, which is furnished with at least one mechanically weakened area 211, 212 and is in said weakened area 211, 212 by means of appropriate mechanical loading separable apart from the residual material of said branch 21. Said weakened area 211, 212 is an area, in which the transversal cross-section is essentially smaller than in the residual areas of the branch 21 of the basic electric conductor 2 (FIG. 4).

Figure 4:
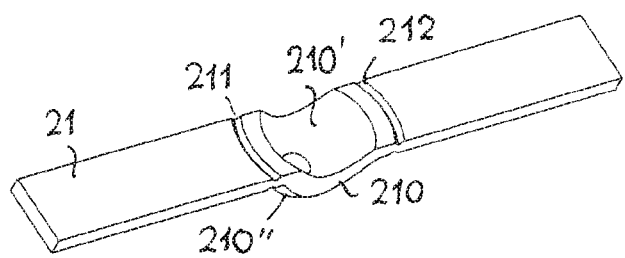
FIG. 4 is presentation of one of possible embodiments of the branch of the basic conductor, which is suitable for interruption.

In the embodiment according to FIG. 4 said electric circuit comprises, in addition to said conductors 21, 22, 23, also a pyrotechnic actuator 24, which is suitable for being triggered in each predetermined circumstances and by fulfilling each predetermined conditions, and is arranged adjacent to said section 210 of said weakened branch 21 of the basic conductor 2. Consequently, said section 210 is by means of said pyrotechnic actuator 24 mechanically separable apart from the rest of said branch 21 and displaceable into the gap G between said sections 231, 232 of the alternative conductor 23. To this aim, said removable section 210 of the branch 21 of the basic electric conductor 2, which is furnished with said weakened portion 211, 212, is on that its side, which is faced towards said pyrotechnic actuator 24, furnished with a cavity 210', and is moreover on its opposite side, which is faced towards said gap G between said sections 231, 232 of the alternative electric conductor 23, furnished with a convex external surface 210", which is suitable for being impressed and then jammed between said sections 231, 232 of the alternative electric conductor 23 within the gap G. Said removable section 210 is separable apart from the rest of said branch 21 of the basic electric conductor 2 in the area of said weakened areas 211, 212 and displaceable into said gap G in order to remain jammed between the sections 231, 232 of the alternative electric conductor 23 by means of a pressure, which is established by means of explosion of chemical reactants within said pyrotechnic actuator 24, which is initiated by triggering said actuator 24 in each predetermined circumstances and by fulfilling each predetermined conditions. The presence of said concave cavity 210' can substantially contribute to efficiency of displacing said section 210 by means of explosion. In order to assure said triggering of the actuator 24 in each predetermined circumstances and by fulfilling each predetermined conditions, said actuator 24 is connected with at least one sensor 25 is capable to generate a signal, which is required for activation thereof. In this, said sensor 25 can be sensor, which is capable to detect acceleration or temperature or each value of the electric circuit within the electric circuit, or any other suitable sensor.

Each person skilled in the art will understand that said alternative electric conductor 23 can be electrically connected with at least one further branch 22 of the basic electric conductor 2 and optionally with at least one further electric component, or optionally also with at least one further electric circuit. In the embodiment according to FIG. 1 a fuse 26 is connected in parallel with said branch 21. Whenever said electric circuit is energized by an active direct or alternative voltage source, such generated electric current is flowing from said source 1 through both branches 21, 22 of the basic electric conductor 2 and through the load L, but not also through the alternative conductor 23 as long as it is interrupted in the area of the gap (G) between said sections 231, 232.

As soon as each predetermined circumstances occur and each predetermined conditions are fulfilled, e.g. by occurring an electric overload or in any other critical situation, e.g. by electric-powered vehicle crash, which is e.g. identified by said sensor 25 for detecting of accelerations, said section 210 of the branch 21, which is in parallel connected with the alternative conductor 23 is in a very short time separated from the rest of said branch 21 and displaced into the area of the gap G on the alternative conductor 23, whereupon said alternative conductor is bridged i.e. uninterrupted and herewith electrical conductive, while the previously active branch 21 remains interrupted and is consequently not electric conductive anymore. Said displacement of the section 21 is performed quickly and in an irreversible manner, by which the section remains jammed between both sections 231, 232 of the alternative conductor 23.

Each person skilled in the art will also understand that there is no real possibility for re-establishing of such interrupted circuit through said branch 21, and also not for e.g. deflection or vibrating of the interrupting element i.e. the section 210, and also not for establishing of electric arc or for overheating of electric conductors 21, 22, 23 or for establishing of a short-circuit. It is therefore clear that the previously exposed technical problem is herewith completely resolved.

Within the context of same disclosure also a method for changing of the electric current path within the electric circuit is proposed, namely in a circuit, which comprises at least a direct or alternative voltage source 1 as well as at least one electric load L, which is via a primary branch 21 and a secondary branch 22 of a basic electric conductor 2 electrically connected with said electric voltage source 1, and wherein an alternative electric conductor 23 is connected in parallel to one branch 21 of said basic conductor 23 and is interrupted by a gap G, so that in each predetermined circumstances and by fulfilling each predetermined conditions said branch 21 can be physically interrupted, upon which the electric current therein is redirected through said alternative electric conductor 23. The disclosure proposes that said redirecting of the electric current within said circuit, which is generated by said source 1, is performed by physical removal of a section 210 of the branch 21 of the basic electric conductor 2 apart from the rest thereof, and by displacing said section 210 into said gap G between said sections 231, 232 of the alternative conductor 23, which is in parallel connected with said branch 21, so that said gap G between said sections 231, 232 is herewith bridged and the current is redirected through said alternative conductor 23, while said branch 21 remains permanently interrupted and each conduction of the electric current there-through is disabled.

Displacement of said section 210 into said gap G between both sections 231, 232 of the alternative conductor 23 can be performed by using mechanical means or by means of explosion, or optionally even by means of a suitable magnetic field.

It is therefore clear that also the electric circuit, in which said redirection of the electric current is realized in accordance with such method, completely resolves the previously exposed technical problem.

What is claimed is:

1. An alternatively changeable electric circuit, comprising:
    a source of a direct or alternative voltage;
    an electric load which is electrically connected with said voltage source via a primary branch and a secondary branch of a basic electric conductor; and
    an alternative electric conductor which is connected in parallel with both the primary branch and secondary branch of the basic electric conductor;
    wherein upon a predetermined circumstance, said primary branch is physically interrupted, upon which an electric current, which initially flowed through said primary branch, is then redirected through said alternative electric conductor;
    wherein said alternative electric conductor comprises a pair of electric conductive sections aligned with each other and spaced apart from each other at a distance, so that an electrically insulating gap is formed therebetween, and that said primary branch of the basic conductor includes an electrically conductive element, which upon said predetermined circumstance is physically removable from the said primary branch and displaceable into said gap between said pair of electric conductive sections of the alternative electric conductor, which becomes bridged and electrically conductive;
    wherein said electrically conductive element represents a part of material of said primary branch of the basic electric conductor, which has a mechanically weakened area and is in said weakened area by means of appropriate mechanical loading separable apart from said primary branch,
    wherein said weakened area is an area having a transversal cross-section essentially smaller than the primary branch of the basic electric conductor; and
    wherein the circuit further comprises a pyrotechnic actuator, which is suitable for being triggered in the redetermined circumstance and is arranged adjacent to said conductive element of said primary branch, so that said conductive element is by means of said pyrotechnic actuator mechanically separable apart from said primary branch and displaceable into the gap between said pair of electric conductive sections of the alternative electric conductor; and
    wherein said conductive element of the primary branch of the basic electric conductor, which has said weakened area, is on a side, which is faced towards said pyrotechnic actuator, furnished with a concave cavity, and is moreover on an opposite side, which is faced towards said gap between said pair of electric conductive sections of the alternative electric conductor, furnished with a convex external surface, which is suitable for being impressed and jammed between said pair of electric conductive sections of the alternative electric conductor within the gap.

2. The circuit according to claim 1, wherein said electrically conductive element is separable apart from the primary branch of the basic electric conductor at said weakened areas and displaceable into said gap in order to remain jammed between the pair of electric conductive sections of the alternative electric conductor by means of a pressure, which is established by means of explosion of chemical reactants within said pyrotechnic actuator, which is initiated in the predetermined circumstance.

3. The circuit according to claim 2, wherein said pyrotechnic actuator is connected with a sensor, which in the predetermined circumstance generates a signal, which is required for activation of said actuator.

4. The circuit according to claim 3, wherein the sensor is an accelerations detecting sensor.

5. The circuit according to claim 3, wherein the sensor is a temperature detecting sensor.

6. The circuit according to claim 3, wherein the sensor is a sensor, which is capable to detect values of the electric current in the basic electric conductor.

7. The circuit according to claim 3, wherein said alternative electric conductor is electrically connected with the secondary branch of the basic electric conductor as well as a further electric component.

8. The circuit according to claim 3, wherein said alternative electric conductor (23) is electrically connected with the secondary branch of the basic electric conductor as well as a further electric circuit.

9. A method for changing an electric current path within an electric circuit, wherein said circuit comprises an electric voltage source, an electric load electrically connected with said electric voltage source via a primary branch and a secondary branch of a basic electric conductor, and an alternative electric conductor connected in parallel to the primary branch of said basic conductor and interrupted by a gap between a pair of conductive sections of the alternative conductor, said method comprising:
    physically interrupting, upon a predetermined circumstances, the primary branch by physical removal of a removable section of the primary branch of the basic electric conductor;
    displacing said removable section into said gap so that said gap between said pair of conductive sections is bridged and the current is redirected through said alternative conductor;
    permanently jamming said removable section between the pair of conductive sections of the alternative electric conductor, such that said primary branch of the basic electric conductor remains permanently interrupted and conduction of the electric current there-through is disabled;

redirecting the electric current within said circuit through the alternative electric conductor;

wherein said displacing of the removable section into said gap between the pair of conductive sections of the alternative electric conductor is performed by means of explosion acting towards a concave cavity of said removable section.

* * * * *

UNITED STATES PATENT AND TRADEMARK OFFICE
CERTIFICATE OF CORRECTION

PATENT NO. : 11,152,175 B2  
APPLICATION NO. : 16/980813  
DATED : October 19, 2021  
INVENTOR(S) : Koprivsek et al.

Page 1 of 1

It is certified that error appears in the above-identified patent and that said Letters Patent is hereby corrected as shown below:

In the Claims

Claim 1, Column 7, Line 67: "redetermined" should be --predetermined--;

Claim 4, Column 8, Line 34: "accelerations" should be --acceleration--; and

Claim 9, Column 8, Line 57: "circumstances" should be --circumstance--.

Signed and Sealed this  
Fourteenth Day of December, 2021

Drew Hirshfeld  
*Performing the Functions and Duties of the*  
*Under Secretary of Commerce for Intellectual Property and*  
*Director of the United States Patent and Trademark Office*